(12) United States Patent
Knott et al.

(10) Patent No.: US 12,018,799 B2
(45) Date of Patent: Jun. 25, 2024

(54) SYSTEM AND METHOD FOR AUTONOMOUS OPERATION OF PIPELINE AND MIDSTREAM FACILITY SYSTEMS

(71) Applicant: CRUX Operations Control Management Limited, Calgary (CA)

(72) Inventors: Victoria Knott, Calgary (CA); Roger Shirt, Garibaldi Highlands (CA); Fernando Otero, Westfield, IN (US)

(73) Assignee: Crux Operations Control Management Limited, Calgary (CA)

( * ) Notice: Subject to any disclaimer, the term of this patent is extended or adjusted under 35 U.S.C. 154(b) by 348 days.

(21) Appl. No.: 17/295,182

(22) PCT Filed: Nov. 21, 2019

(86) PCT No.: PCT/CA2019/051673
§ 371 (c)(1),
(2) Date: May 19, 2021

(87) PCT Pub. No.: WO2020/102908
PCT Pub. Date: May 28, 2020

(65) Prior Publication Data
US 2022/0010935 A1    Jan. 13, 2022

Related U.S. Application Data

(60) Provisional application No. 62/770,668, filed on Nov. 21, 2018.

(51) Int. Cl.
*F17D 3/01*     (2006.01)
*F17D 5/00*     (2006.01)
(Continued)

(52) U.S. Cl.
CPC ............. *F17D 3/01* (2013.01); *F17D 5/00* (2013.01); *G05B 19/416* (2013.01); *G05D 16/208* (2013.01); *G05B 2219/37371* (2013.01)

(58) Field of Classification Search
CPC .......... F17D 3/01; F17D 5/00; G05B 19/416; G05B 2219/37371; G05D 16/208
See application file for complete search history.

(56) References Cited

U.S. PATENT DOCUMENTS

| 7,720,575 B2 | 5/2010 | Ferber |
| 2002/0077711 A1* | 6/2002 | Nixon ................ C10G 11/187 700/51 |

(Continued)

FOREIGN PATENT DOCUMENTS

| CA | 2636428 | 7/2007 |
| CA | 2664492 | 4/2008 |

(Continued)

OTHER PUBLICATIONS

International Search Report and Written Option dated Jan. 21, 210201 in related International Application PCT/CA19/51673 filed Nov. 21, 2019 (15 pages).

(Continued)

*Primary Examiner* — Ramesh B Patel
(74) *Attorney, Agent, or Firm* — Dentons US LLP

(57) ABSTRACT

In a system and method for supervisory management of fluid pipeline/LNG plant/gas plant/refinery/offshore oil and gas platform allowing simultaneous execution of commands at all control points, significantly increasing the speed at which an optimal set-point can be achieved in comparison to manual entry of commands. The pipeline/LNG plant/gas plant/refinery/offshore oil and gas platform control system has a cascade control configuration that can operate in conjunction with existing pipeline/LNG plant/gas plant/refinery/offshore oil and gas platform protection systems. The control room operator can activate automatic operation via the supervisory management system, and can subsequently command that the system switch back to manual control instantaneously. Dynamic models predict operating (Continued)

conditions of pipeline/LNG plant/gas plant/refinery/offshore oil and gas platform processes subject to constraints on pressure and other operating parameters. A steady-state optimization layer, operating in conjunction with real-time control, determines optimal states without operator intervention.

22 Claims, 10 Drawing Sheets

(51) Int. Cl.
    *G05B 19/416*     (2006.01)
    *G05D 5/00*     (2006.01)
    *G05D 16/20*     (2006.01)

(56) References Cited

U.S. PATENT DOCUMENTS

| | | | |
|---|---|---|---|
| 2006/0009881 A1* | 1/2006 | Ferber | G05D 7/0647 700/282 |
| 2008/0082215 A1 | 4/2008 | McDowell | |
| 2009/0322544 A1* | 12/2009 | McDowell | F17D 5/06 73/40.5 R |
| 2014/0058534 A1* | 2/2014 | Tiwari | G05B 13/04 700/9 |
| 2014/0130878 A1 | 5/2014 | Marinez | |
| 2015/0047738 A1* | 2/2015 | Wilson | F17C 13/026 141/95 |
| 2015/0300907 A1 | 10/2015 | Giunta et al. | |
| 2015/0337218 A1* | 11/2015 | Ricotta | C10G 53/02 208/187 |
| 2017/0003200 A1* | 1/2017 | McDowell | G01M 3/2815 |
| 2017/0030359 A1 | 2/2017 | Fowler | |
| 2017/0227271 A1* | 8/2017 | Hsieh | F25B 49/02 |
| 2018/0216784 A1* | 8/2018 | Sun | F17D 3/01 |
| 2018/0274347 A1* | 9/2018 | Ricotta | E21B 43/34 |
| 2019/0176944 A1 | 6/2019 | Cherami et al. | |
| 2020/0101505 A1* | 4/2020 | Quigley | B09B 1/006 |
| 2022/0108262 A1* | 4/2022 | Cella | G06Q 10/063118 |

FOREIGN PATENT DOCUMENTS

| | | |
|---|---|---|
| CN | 104571068 | 4/2015 |
| RU | 2504458 | 1/2014 |
| RU | 2685500 | 4/2019 |
| WO | WO2014/096019 | 6/2014 |

OTHER PUBLICATIONS

Aalto, Model Predictive Control of Natural Gas Pipeline Systems—a case for Constrined System Identification, IFAC—PapersOnLine, 48-30, 2015, pp. 197-202.

Blazic et al., Simple model of a multi-batch driven pipeline, Mathematics and Computers in Simulation 64, 2004 pp. 617-630.

China Office Action dated Feb. 15, 2023 in related application 201980079556.5 filed Nov. 21, 2019 (6 pages).

China Office Action dated Jul. 20, 2022 in related application 201980079556.5 filed Nov. 21, 2019 (9 pages).

Europe Search Report dated Jul. 15, 2022 in related application 19886118.9 filed Nov. 21, 2019 (6 pages).

Russian Federation Office Action dated May 22, 2023 in related application 2021116642 filed Nov. 21, 2019 (8 pages).

Skworcow et al., Model Predictive Control for Energy and Leakage Management in Water Distribution Systems, ResearchGate, Jan. 2010, Conference Paper (7 pages).

\* cited by examiner

SYSTEM AND METHOD FOR AUTONOMOUS OPERATION OF PIPELINE AND MIDSTREAM FACILITY SYSTEMS

The present application claims the benefit of priority to PCT International Application Serial Number PCT/CA19/51673 filed 21 Nov. 2019; which claims the benefit of U.S. Provisional Application Ser. No. 62/770,668 filed 21 Nov. 2018; each of which is incorporated herein by reference in its entirety.

TECHNICAL FIELD

The present disclosure relates generally to supervisory management of fluid pipeline systems in oil and gas midstream facilities as it pertains to control room operations, and more particularly to systems and methods for automatic operation, providing guidance to control room operators, including manual override, of fluid pipeline processes in transport and gathering systems.

BACKGROUND

Liquid pipelines of oil and gas midstream facilities transport various commodities such as heavy, medium or light crude oils, condensates, natural gas liquids, refined products and water. Gas pipelines carry natural gas (lean or rich), steam, and $CO_2$. In either category of pipelines, fluid is moved by pumps or compressors situated at the beginning and at strategic locations along the length of the pipeline system. Transport pipelines may range from one to several thousand kilometers in length and may include from one pump/compressor station to more than fifty pump/compressor stations. Pipeline gathering systems can connect multiple wells, each with its own pump/compressor, into a single pipeline, which may then feed processing plants or another transport pipeline. Pipeline distribution systems generally start with a single pipeline branching off into multiple lines lines LNG processing plant midstream facilities facilitate the separation of liquids and impurities from natural gas and enables the liquefaction of the product for efficient transportation. Gas plant processing midstream facilities facilitate the separation of natural gas product from high value liquid product for transportation on pipeline systems. Refineries process crude oil to high value petroleum products for commercial use. Offshore oil and gas platforms collect and process oil and gas petroleum products from offshore wells and separate the products into liquid and gas products for transportation on ships or pipelines LNG processing plant midstream facilities facilitate the separation of liquids and impurities from natural gas and enables the liquefaction of the product for efficient transportation. Gas plant processing midstream facilities facilitate the separation of natural gas product from high value liquid product for transportation on pipeline systems. Refineries process crude oil to high value petroleum products for commercial use. Offshore oil and gas platforms collect and process oil and gas petroleum products from offshore wells and separate the products into liquid and gas products for transportation on ships or pipelines.

In conventional operation of pipeline, LNG plant, Gas Plant, refinery, and offshore oil and gas platform facilities, various operating conditions of equipment at the facility are set by the control room operator using a Supervisory Control and Data Acquisition (SCADA) system. For example, pipeline facilities include pump/compressor stations that require monitoring and control of output pressures. LNG facilities include compressors/heat exchangers/distillation columns. Gas plant facilities include compressors/pumps/heat exchangers/separation drums/distillation columns. Refinery facilities include compressors/heat exchangers/distillation columns, fluid catalytic crackers, cokers and other such crude processing equipment. Offshore oil and gas platforms include compressors/pumps/heat exchangers/separation drums/distillation columns and subsea pipeline tie-back networks connecting subsea oil and gas wells to the platform. The pipeline operator sets an overall flow rate of the pipeline via the pipeline control system by setting pressure set-points and by determining the number of pumps and compressors that are in operation at given pump/compressor stations. The control room operator for the LNG plant sets an overall flow rate for the facility via the LNG plant control system by setting pressure, flow, temperature set points and by determining timing and sequencing of start commands for individual pieces of equipment in the plant. The control room operator for the Gas Plant sets an overall flow rate for the facility via the Gas Plant control system by setting pressure, flow, temperature set points and by determining timing and sequencing of start commands for individual pieces of equipment in the plant. The control room operator for the refinery sets an overall flow rate for the facility via the refinery control system by setting pressure, flow, temperature set points and by determining timing and sequencing of start commands for individual pieces of equipment in the refinery. The control room operator for the offshore oil and gas platform sets an overall flow rate for the facility via the offshore oil and gas platform control system by setting pressure, flow, temperature set points and by determining timing and sequencing of start commands for individual pieces of equipment in the offshore oil and gas platform and associated sub-sea pipeline tie-back network.

A single pipeline operator controls one or more pipelines and is expected to ensure that each pipeline is operated within safe limits at all times. Ensuring safe, effective operation entails numerous duties such as controlling start up and stop flow, adjusting flowrates when the pipeline is running, taking actions in response to unexpected operational problems, and communicating with field personnel regarding planned and unplanned operating events. A single or multiple control room operator in an LNG plant controls one or more pieces of equipment in the facility simultaneously and is expected to ensure each piece of equipment is operated within safe limits at all times. Ensuring safe, effective operation entails numerous duties such as controlling start-up and stop flow, adjusting flow rates/temperatures/pressures when the facility is running, taking actions in response to unexpected operational problems, and communicating with field personnel regarding planned and unplanned operating events. A single or multiple control room operator in a Gas Plant controls one or more pieces of equipment in the facility simultaneously and is expected to ensure each piece of equipment is operated within safe limits at all times. Ensuring safe, effective operation entails numerous duties such as controlling start-up and stop flow, adjusting flow rates/temperatures/pressures when the facility is running, taking actions in response to unexpected operational problems, and communicating with field personnel regarding planned and unplanned operating events. A single or multiple control room operator in a Refinery controls one or more pieces of equipment in the facility simultaneously and is expected to ensure each piece of equipment is operated within safe limits at all times. Ensuring safe, effective operation entails numerous duties such as controlling start-up and stop flow, adjusting flow rates/temperatures/pressures when the facility is running, taking actions in response to unexpected operational problems, and communicating with field personnel regarding planned and unplanned operating events. A single or multiple control room operator in an offshore oil and gas platform controls one or more pieces of equipment in the facility simultaneously and is expected to ensure each piece of equipment is operated within safe limits at all times. Ensuring safe, effective operation entails numerous duties such as controlling start-up and stop flow, adjusting flow rates/temperatures/pressures when the facility is running, taking actions in response to unexpected operational problems, and communicating with field personnel regarding planned and unplanned operating events.

Conventional SCADA pipeline, LNG plant, Gas Plant, refinery, offshore oil and gas platform control systems have limitations that can cause substantial difficulties for pipeline, LNG plant, Gas Plant, refinery, offshore oil and gas platform operators. Changes made to pressure/temperature/flow set-points and pump/compressor/heat exchanger/distillation column/valve operations at one point in the pipeline, LNG plant, Gas Plant, refinery, or offshore oil and gas platform affect all other points in the line. There can be long time delays between control actions at one point and effects at other points in the system. These delays can require the pipeline/LNG/Gas Plant/refinery/offshore oil and gas platform operator to wait to observe the effect of the current control action before taking subsequent actions, and can require laborious stepwise control procedures. Another problem is manual processes used by pipeline/LNG/Gas Plant/refinery/offshore oil and gas platform operators in setting pressure/flow/temperature set-points and issuing pump/compressor start/stop commands. A long pipeline or complex pipeline network may require the pipeline operator to take over 1,000 such actions. A complex LNG, Gas Plant, refinery, or offshore oil and gas platform may require the control room operator to take over 1,000 such action as well. Unexpected events can cause large pressure/flow/temperature disturbances requiring rapid response by the pipeline/LNG/Gas Plant/refinery/offshore oil and gas platform operator. In this context, the manual burden on control center operators in issuing set-points and pump/compressor start commands reduces the operators' ability to monitor the overall performance and safety of the pipeline/LNG Plant/Gas Plant/refinery/offshore oil and gas platform. These factors increase likelihood of erroneous entries, e.g., due to inexperience or operator fatigue, and can adversely affect pipeline/LNG Plant/Gas Plant/refinery/offshore oil and gas platform uptime and safety.

Various previous pipeline/LNG Plant/Gas Plant/refinery/offshore oil and gas platform control systems have sought to ameliorate these problems. However, the pipeline/LNG Plant/Gas Plant/refinery/offshore oil and gas platform operator still must manually determine a sequence of control actions to achieve advised inputs.

SUMMARY

The present disclosure provides improvements to conventional pipeline/LNG Plant/Gas Plant/refinery/offshore oil and gas platform control systems that increase autonomous operation of such systems, increases efficiency of the operations of such systems, and increases safety of such systems. A related improvement is in the ability of pipeline/LNG Plant/Gas Plant/refinery/offshore oil and gas platform control systems to establish equipment settings such as pressure/flow/temperature set-points at one part of the pipeline/LNG Plant/Gas Plant/refinery/offshore oil and gas platform so as to anticipate operating effects at other points in the system. Another improvement is a reduction in the number of manual operations by pipeline/LNG Plant/Gas Plant/refinery/offshore oil and gas platform operators such as manual pressure/temperature/flow set-points and pump/compressor start commands. A further improvement is to provide calculated equipment set-points to the pipeline/LNG Plant/Gas Plant/refinery/offshore oil and gas platform operator on an advisory basis up to three hours in the future, while eliminating the requirement that the pipeline/LNG Plant/Gas Plant/refinery/offshore oil and gas platform operator determine a sequence of control actions to achieve advisory inputs.

Embodiments described herein can automatically calculate optimal control actions to achieve a desired flow rate target in a pipeline/LNG Plant/Gas plant/refinery/offshore oil and gas platform systems, and can implement commands on behalf of the pipeline/LNG Plant/Gas Plant/refinery/offshore oil and gas platform operator to carry out the control actions. The system and method of the present disclosure are capable of maintaining optimal operating conditions at the target flow rate, including in batched pipelines. This system and method can also be used as an advisory service for pipeline/LNG Plant/Gas Plant/refinery/offshore oil and gas platforms operators to enable them to operate more effectively if preferred over autonomous operation.

The system of the present disclosure allows simultaneous execution of commands at all control points. Due to the multivariable and interactive nature of the pipeline/LNG plant/Gas Plant/refinery/offshore oil and gas platform systems, this simultaneous execution significantly increases the speed at which a desired optimal set-point can be achieved in comparison to manual entering of commands on a one-at-a-time basis. Automatic transition control reduces pipeline/LNG plant/Gas plant/refinery/offshore oil and gas platform operator burden by eliminating the need to manually enter set-points, which can change frequently. This reduced burden enables operators to monitor the pipeline/LNG plant/Gas plant/refinery/offshore oil and gas platform more closely for unexpected events affecting the system as a whole, and to take responsive actions more rapidly.

In various embodiments, the system of the present disclosure includes a cascade control configuration that can operate in conjunction with existing pipeline/LNG plant/Gas plant/refinery/offshore oil and gas platform protection systems, and that mimics current pipeline/LNG plant/Gas plant/refinery/offshore oil and gas platform operator actions.

The system and method of the present disclosure improve safety of pipeline/LNG plant/Gas plant refinery/offshore oil and gas platform operations by building pre-emptive actions into the automatic control procedures. These pre-emptive actions remediate frequent fault scenarios, such as a pump station trip, faster than a human operator can respond. In various embodiments, the present system and method incorporate fully dynamic models that account for dynamic state of pipeline processes. These dynamic models predict operating conditions of pipeline processes as part of control procedures. Pressure and operating constraints are explicitly incorporated into an optimal dynamic solution. These fully dynamic models represent an improvement over prior systems that utilized steady-state predictions that do not account for past and future trajectories of pipeline processes.

In various embodiments, the present system and method incorporate fully dynamic models that account for dynamic state of pipeline/LNG plant/Gas plant/refinery/offshore oil and gas platform processes. These dynamic models predict operating conditions of pipeline/LNG plant/gas plant/refinery/offshore oil and gas platform processes as part of control procedures. Pressure/flow/temperature and operating constraints are explicitly incorporated into an optimal dynamic solution. These fully dynamic models represent an improvement over prior systems that utilized steady-state predictions that do not account for past and future trajectories of pipeline/LNG plant/gas plant/refinery/offshore oil and gas platform processes across multiple pump/compressor stations or pieces of equipment throughout the plant.

The fully dynamic models of the present disclosure include physical hydraulic transient models that provide control calculations based upon changing hydraulic environments, including batched pipelines. Physical hydraulic transient modeling represents an improvement over conventional systems that compare current operating conditions with a database of stored possible scenarios. This type of database requires time consuming development, and may not cover the full range of desired operation once development has been completed for a given project.

In various embodiments, the present system and method incorporate a steady-state optimization layer in conjunction with real-time control. The steady-state optimization layer seeks to achieve optimized states without operator intervention. This feature reduces time between optimization calculations, and improves the ability of the system to maintain an optimized state at all times.

In various embodiments, the method includes receiving at a processor a first data relating to a first pressure at a first portion of a pipeline, wherein a first valve is coupled to the first portion; receiving at the processor a second data relating to a second pressure at a second portion of the pipeline, wherein a second valve is coupled to the second portion; receiving at the processor a third data relating to a first status of a first pump coupled to the pipeline; receiving at the processor a fourth data relating to a second status of a second pump coupled to the pipeline; automatically adjusting, via the processor, at least two of the first pump, the second pump, the first valve or the second valve, to at least one of maintain or stabilize a pressure of the pipeline.

In various embodiments, the method includes wherein the pressure of the pipeline is maintained within a safe pressure range. In various embodiments, the method further comprises monitoring a first sensor coupled to the first portion and a second sensor coupled to the second portion. In various embodiments, the method includes wherein the adjusting is controlled based on at least one of a first output from the first sensor and a second output from the second sensor. In various embodiments, the method further comprises receiving at the processor a fifth data relating to a first temperature at a fifth portion of the pipeline. In various embodiments, the method further comprises receiving at the processor a sixth data relating to a second temperature at a sixth portion of the pipeline. In various embodiments, the method further comprises receiving at the processor a seventh data relating to a first flow rate at a seventh portion of the pipeline. In various embodiments, the method further comprises receiving at the processor an eighth data relating to a second flow rate at an eighth portion of the pipeline. In various embodiments, the method further comprises receiving at the processor a ninth data relating to a leak in the pipeline.

In various embodiments, the method includes receiving at a processor a first data relating to a first pressure at a first portion of a plant, wherein a pump is coupled to the first portion; receiving at the processor a second data relating to a second pressure at a second portion of the plant, wherein a compressor is coupled to the second portion; receiving at the processor a third data relating to a first status of a heat exchanger coupled to the plant; receiving at the processor a fourth data relating to a first status of a distillation column coupled to the plant; automatically adjusting, via the processor, at least two of the pump, the compressor, the heat exchanger or the distillation column, simultaneously, to at least one of maintain or stabilize a pressure of the plant.

In various embodiments, the method further comprises a flare unit coupled to the plant. In various embodiments, the method includes wherein the pressure of the plant is maintained within a safe pressure range. In various embodiments, the method further comprises monitoring a first sensor coupled to the first portion and a second sensor coupled to the second portion. In various embodiments, the method includes wherein the adjusting is controlled based on at least one of a first output from the first sensor and a second output from the second sensor. In various embodiments, the method further comprises receiving at the processor a fifth data relating to a first temperature at a fifth portion of the plant.

In various embodiments, the method includes receiving at a processor a first data relating to a first pressure at a first portion of an offshore platform, wherein a pump is coupled to the first portion; receiving at the processor a second data relating to a second pressure at a second portion of the offshore platform, wherein a subsea tie-back system is coupled to the second portion; receiving at the processor a third data relating to a first status of a top side separation equipment coupled to the offshore platform; receiving at the processor a fourth data relating to a first status of a valve coupled to the offshore platform; automatically adjusting, via the processor, at least two of the pump, the subsea tie-back system, the top side separation equipment, or the valve, simultaneously, to at least one of maintain or stabilize a pressure of the offshore platform.

In various embodiments, the method further comprises a flare unit coupled to the offshore platform. In various embodiments, the method includes wherein the pressure of the offshore platform is maintained within a safe pressure range. In various embodiments, the method further comprises monitoring a first sensor coupled to the first portion and a second sensor coupled to the second portion. In various embodiments, the method includes wherein the adjusting is controlled based on at least one of a first output from the first sensor and a second output from the second sensor. In various embodiments, the method further comprises receiving at the processor a fifth data relating to a first temperature at a fifth portion of the offshore platform.

Other objects, features, and advantages of the present disclosure will become apparent with reference to the drawings and detailed description of the illustrative embodiments that follow.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

Figure 1:
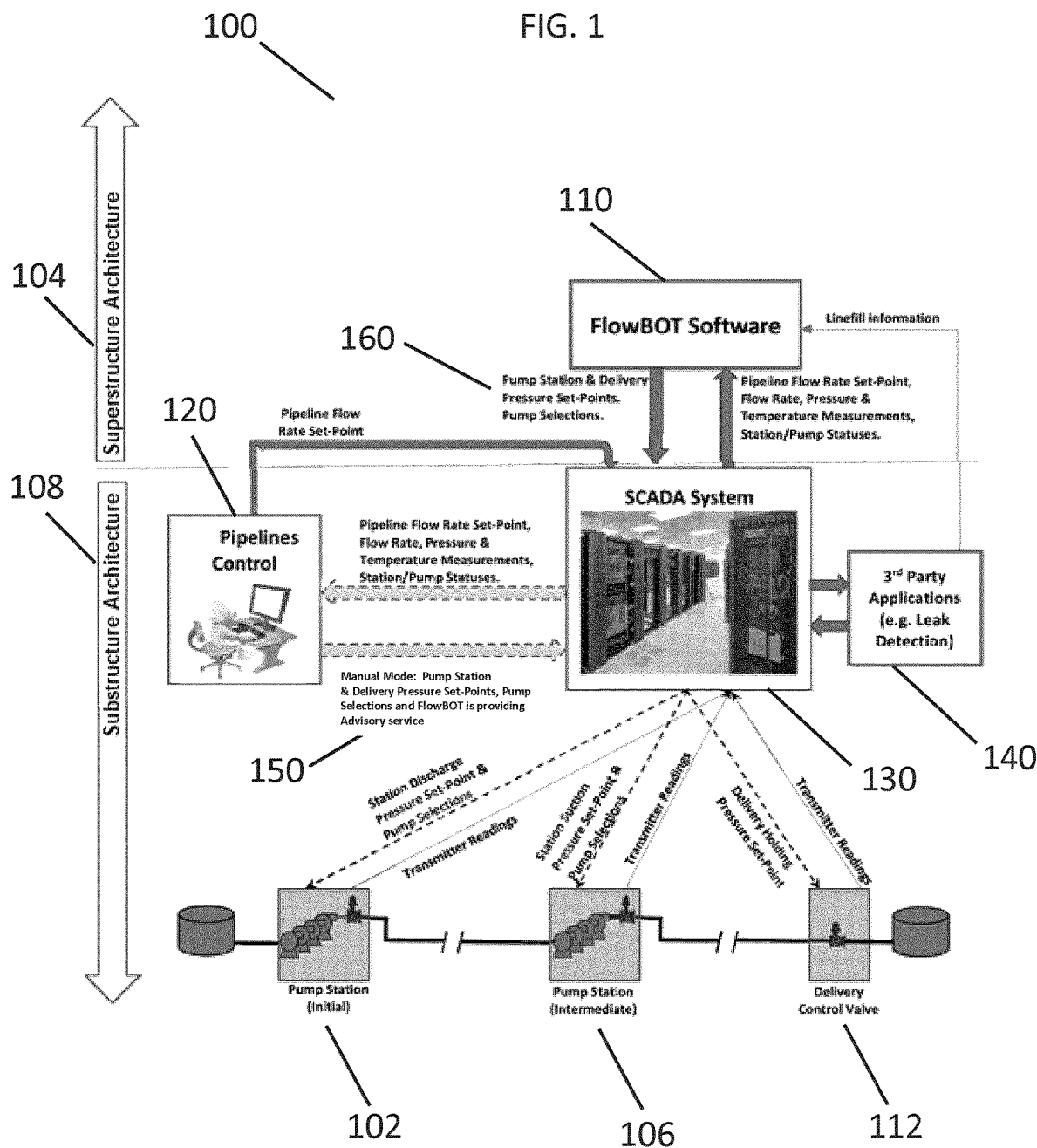
FIG. 1 shows a system architecture of an exemplary pipeline system incorporating the control system of the present disclosure, in accordance with an embodiment which also applies to LNG plants, Gas plants, refineries, and offshore oil and gas platforms and any other such complex processing facility with a central SCADA system and control room operators.

In the following detailed description, reference is made to the accompanying drawings, which depict non-limiting, illustrative embodiments of the present disclosure. Other embodiments may be utilized and logical variations, e.g., structural and/or mechanical, may be implemented without departing from the scope of the present disclosure. To avoid unnecessary detail, certain information, items, or details known to those skilled in the art may be omitted from the following.

Illustrative pipeline/LNG plant/Gas plant/refinery/offshore oil and gas platform control methods of the present disclosure described herein and systems embodying these methods can automatically calculate optimized control actions to achieve a desired flow rate target in a pipeline/LNG plant/Gas plant/refinery/offshore oil and gas platform system, and can implement commands on behalf of the pipeline/LNG plant/Gas plant/refinery/offshore oil and gas platform operator to carry out the control actions. These methods and systems are capable of maintaining optimized operating conditions at the target flow rate, including in batched pipelines. These methods and systems have a range of applications such as transport pipeline systems for oil and gas, gathering pipeline systems, processing plants, refining, off shore oil and gas platforms, other processing industries with sufficient complexity requiring a control room operator and complex SCADA style control system.

Liquid pipelines systems transport various commodities such as heavy, medium or light crude oils, condensates, natural gas liquids, refined products or water. Gas pipelines carry natural gas, steam, and CO2. Natural gas may include dry, or lean, gas mixtures and wet, or rich, gas mixtures. Pipeline systems include transport pipelines, which may range from one to several thousand kilometers in length and have one or more pump/compressor stations, even upward of 50 such stations. Pipeline systems also include gathering pipelines, which connect multiple wells, each with its own pump/compressor, into a single pipeline. Such single pipeline may feed processing plants or another transport pipeline. Pipeline distribution systems generally start with a single pipeline branching off into multiple lines. LNG plants process natural gas feed intro liquid and gas products, then enable the liquefaction of the gas product to enable ease of transport to other markets. Gas Plants enable the separation of liquid and gas products from natural gas feed stream enabling the creation of value add products that are suitable for transportation. Refineries enable the separation of multiple liquid and gas petroleum products from crude oil feed stream enabling the creation of value add products that are suitable for commercial use. Offshore oil and gas platforms enable the collection and separation of liquid and gas petroleum products from sub-sea oil and gas wells via and sub-sea pipeline tie-back network and oil and gas processing facility on the top side of the platform enabling the creation of value add products that are suitable for transportation via pipeline or ship.

In both liquid or gas pipeline systems, fluid is moved by equipment situated at the beginning and in strategic locations along the length of the pipeline system. The equipment includes a supply or inlet station, the initial injection station representing the beginning of the system where the fluid is injected into the line. Compressor/pump stations are pumps for liquid pipelines and compressors for gas pipelines, which are located along the line to move the fluid through the pipeline. Block valve stations are a primary form of protection for pipelines. Using these valves a pipeline operator may isolate a segment of the line for maintenance work or isolate a rupture or leak. A regulator station is a special type of valve station, where the operator can release some of the pressure from the line. A partial delivery station, also known as an intermediate station, allows the pipeline operator to deliver part of the fluid being transported. Last, at the final delivery station, also known as outlet station or terminal, the fluid is distributed to a storage or distribution facility of consumption operations. An outlet station could, for example, be a tank terminal for liquid pipelines, or a connection to a distribution network for gas pipelines. LNG plants consist of compressors, pumps, separation vessels, distillation columns, heat exchangers all in sequence to enable the liquefaction of the natural gas product. LNG plants can deliver into a pipeline, or the product is loaded onto ships for transportation. Gas plants consist of compressors, pumps, separation vessels, distillation columns, heat exchangers all in sequences to enable the separation of liquid petroleum products from gas products for shipment on pipelines or by truck. Refineries consist of compressors, pumps, separation vessels, distillation columns, heat exchangers, fluid catalytic crackers, cokers all in sequences to enable the production of high value petroleum products for commercial sale. Offshore oil and gas platforms consist of compressors, pumps, separation vessels, distillation columns, heat exchangers, sub-sea oil and gas wells and sub-sea pipeline tie back networks all in sequences to enable the separation of oil and gas products form transportation via ships or pipelines.

Each pump/compressor station in an pipeline system may have one or multiple pumps, arranged in series or parallel, along with a control valve at the outlet of the station. Pressures are normally measured at the inlet (suction) and outlet (discharge) of each pump/compressor station. Pressure control is accomplished via adjustments to the control valve opening and/or rotational speed of the pumps/compressor.

In various embodiments, the system of the present disclosure has a cascade control configuration with the SCADA system (supervisory control and data acquisition) of a pipeline facility and is also applicable to LNG Plants, Gas Plant, refineries and offshore oil and gas platforms. SCADA is an industrial control system: a computer system for monitoring and controlling pipeline/LNG Plant/Gas Plant/refineries/offshore oil and gas platform processes. Using the SCADA system, the control room operators can monitor conditions of the facility and send operational commands to the field. Typically, the SCADA system is located at a control center, receives all the field data, and presents it to the control room operator through a set of screens or other user interface showing operational conditions of the pipeline/LNG plant/gas plant/refinery/offshore oil and gas platform. In the present disclosure, pipeline/LNG plant/gas plant/refinery/offshore platform operators are sometimes called control center operators; the system of the present disclosure in a cascade control configuration with a SCADA system is sometimes called a pipeline/LNG plant/Gas/plant/refinery/offshore oil and gas platform control system; and the system and software of the present disclosure are sometimes called the FlowBOT system and software.

FIG. 1 is a system schematic diagram of an exemplary pipeline system 100 incorporating the control system of the present disclosure. System 100 includes substructure pipeline system architecture 108 shown below the horizontal line, and superstructure architecture 104 shown above the line. The superstructure architecture 104 includes the control system of the present disclosure, shown in FIG. 1 as FlowBOT Software 110. In various embodiments, the substructure architecture 108 includes typical major components of a pipeline control system 100, such as, for example, initial pump station 102, intermediate pump station 106, and delivery control valve 112. In an embodiment, FlowBOT 110 is a software program that resides on a server connected to an oil pipeline's existing Supervisory Control and Data Acquisition (SCADA) system 130.

Figure 8:
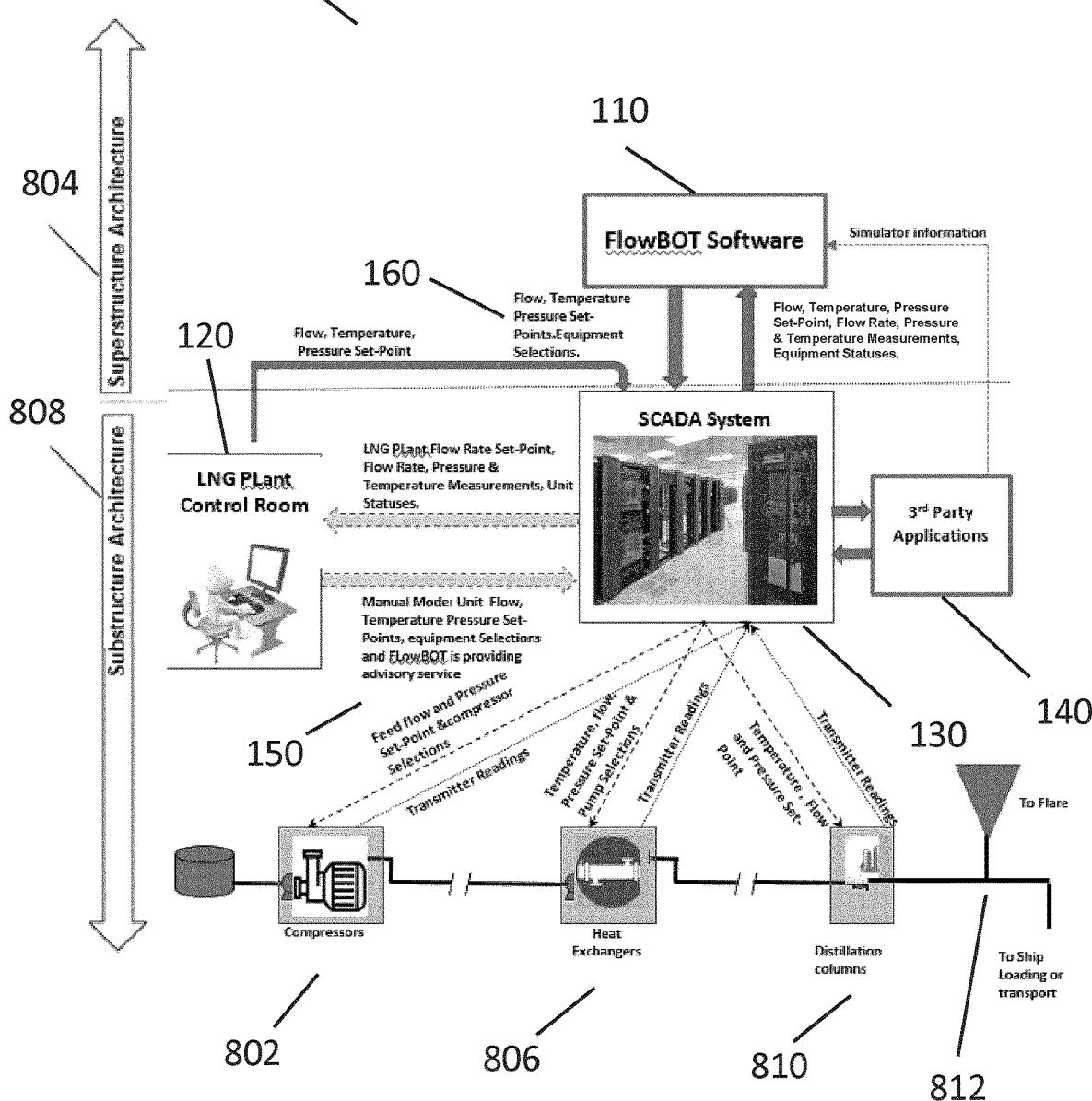
FIG. 8 is a system architecture of an exemplary LNG plant system incorporating the control system of the present disclosure, in accordance with an embodiment which also applies to, Gas plants, refineries, and offshore oil and gas platforms and any other such complex processing facility with a central SCADA system and control room operators.

In one or more embodiments, for example, as shown in FIG. 8, system 800 includes substructure LNG plant system architecture 808 shown below the horizontal line, and superstructure architecture 804 shown above the line. The superstructure architecture 804 includes the control system of the present disclosure, shown in FIG. 8 as FlowBOT Software 110. In various embodiments, the substructure architecture 808 includes typical major components of a LNG plant control system 800, such as, for example, compressors 802, heat exchangers 806, distillation columns 810, and flaring units 812. In an embodiment, FlowBOT 110 is a software program that resides on a server connected to a LNG plant's existing Supervisory Control and Data Acquisition (SCADA) system 130. The LNG plant control system 800 operates in a very similar manner to the operation of pipeline control system 100 of FIG. 1, as set forth below.

Figure 9:
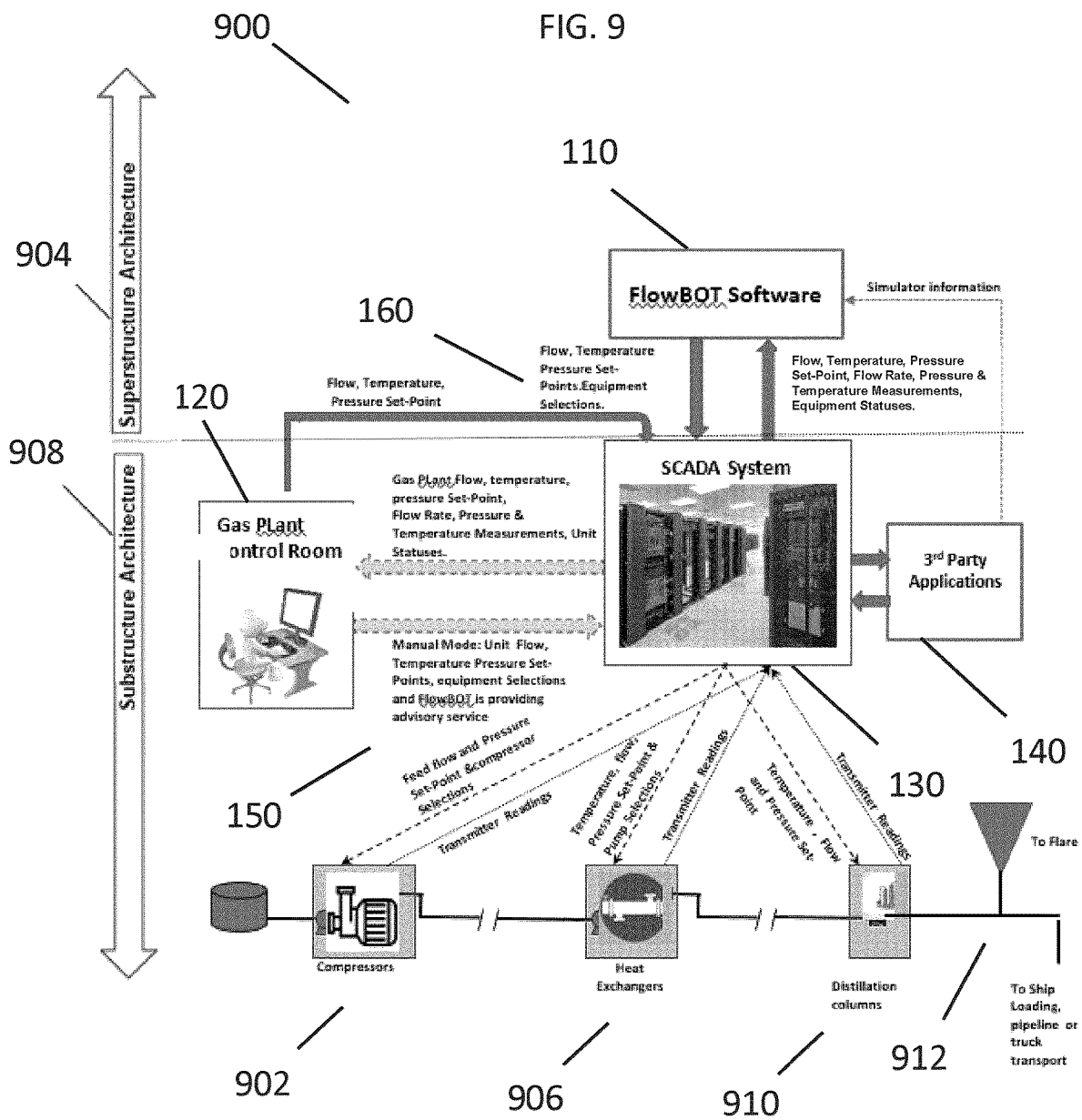
FIG. 9 is a system architecture of an exemplary gas plant system incorporating the control system of the present disclosure, in accordance with an embodiment.

In one or more embodiments, for example, as shown in FIG. 9, system 900 includes substructure gas plant system architecture 908 shown below the horizontal line, and superstructure architecture 904 shown above the line. The superstructure architecture 904 includes the control system of the present disclosure, shown in FIG. 9 as FlowBOT Software 110. In various embodiments, the substructure architecture 908 includes typical major components of a gas plant control system 900, such as, for example, compressors 902, heat exchangers 906, distillation columns 910, and flaring units 912. In an embodiment, FlowBOT 110 is a software program that resides on a server connected to a gas plant's existing Supervisory Control and Data Acquisition (SCADA) system 130. The gas plant control system 900 operates in a very similar manner to the operation of pipeline control system 100 of FIG. 1, as set forth below.

Figure 10:
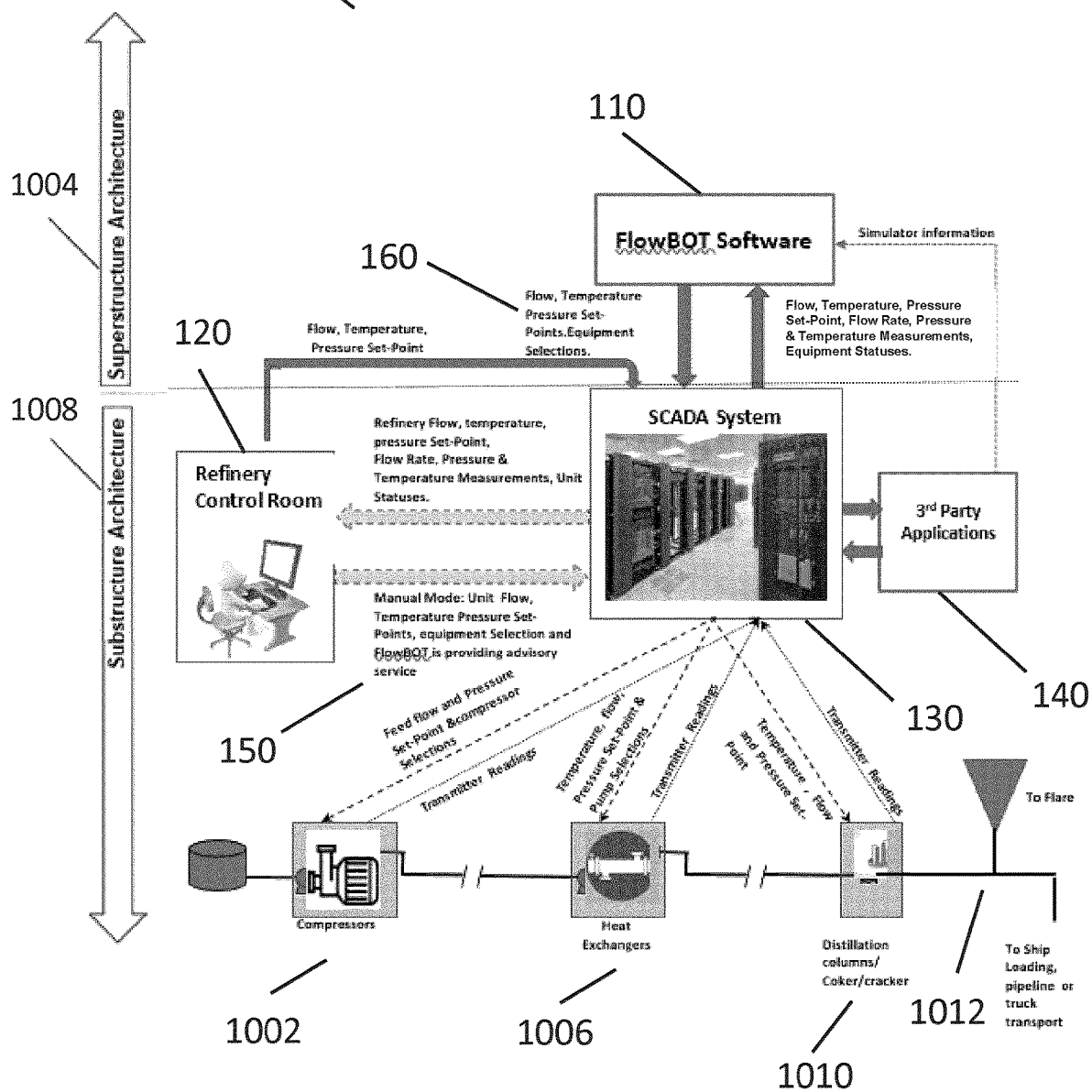
FIG. 10 is a system architecture of an exemplary refinery system incorporating the control system of the present disclosure, in accordance with an embodiment.

In one or more embodiments, for example, as shown in FIG. 10, system 1000 includes substructure refinery system architecture 1008 shown below the horizontal line, and superstructure architecture 1004 shown above the line. The superstructure architecture 1004 includes the control system of the present disclosure, shown in FIG. 10 as FlowBOT Software 110. In various embodiments, the substructure architecture 1008 includes typical major components of a refinery control system 1000, such as, for example, compressors 1002, heat exchangers 1006, distillation columns, cokers, or crackers 1010, and flaring units 1012. In an embodiment, FlowBOT 110 is a software program that resides on a server connected to a refinery's existing Supervisory Control and Data Acquisition (SCADA) system 130. The refinery control system 1000 operates in a very similar manner to the operation of pipeline control system 100 of FIG. 1, as set forth below.

Figure 11:
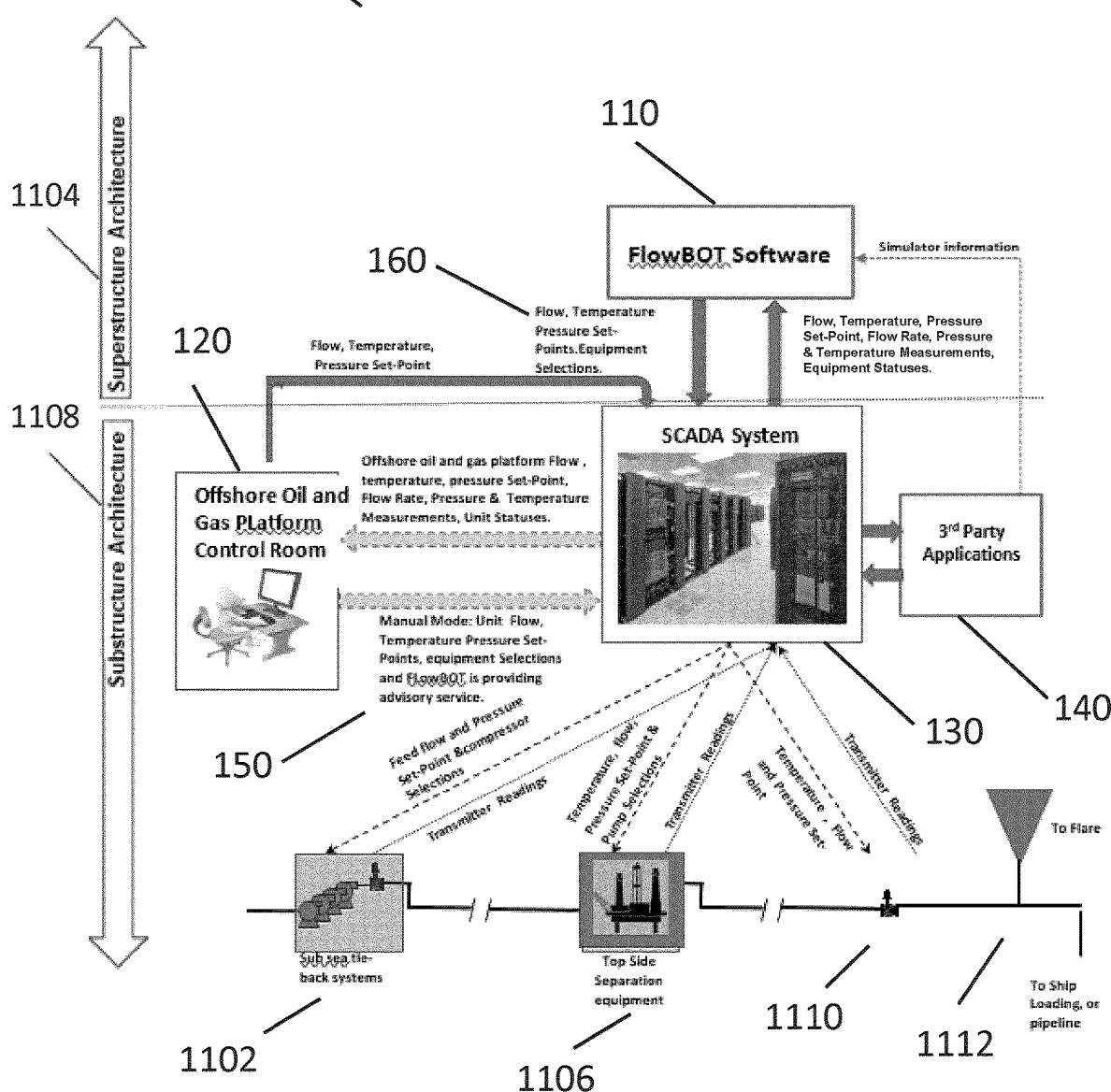
FIG. 11 is a system architecture of an exemplary offshore oil and gas platform system incorporating the control system of the present disclosure, in accordance with an embodiment.

In one or more embodiments, for example, as shown in FIG. 11, system 1100 includes substructure offshore oil and gas platform system architecture 1108 shown below the horizontal line, and superstructure architecture 1104 shown above the line. The superstructure architecture 1104 includes the control system of the present disclosure, shown in FIG. 11 as FlowBOT Software 110. In various embodiments, the substructure architecture 1108 includes typical major components of an offshore oil and gas platform control system 1100, such as, for example, sub-sea tie back systems 1102, top side separation equipment 1106, control valve 1110, and flaring units 812. In an embodiment, FlowBOT 110 is a software program that resides on a server connected to an offshore oil and gas platform's existing Supervisory Control and Data Acquisition (SCADA) system 130. The offshore oil and gas platform control system 1100 operates in a very similar manner to the operation of pipeline control system 100 of FIG. 1, as set forth below.

In another embodiment, the FlowBOT 110 software program is connected to a modified version of the oil pipeline's existing Supervisory Control and Data Acquisition (SCADA) system 130, e.g., a SCADA system that includes modifications to its user interface.

FlowBOT Software 110 can be executed by a server, authorized client computing devices, smartphones, desktop computers, laptop computers, tablet computers, PDAs and other types of processor-controlled devices that receive, process and/or transmit digital data. FlowBOT 110 can be implemented using a single-processor system including one processor, or a multi-processor system including any number of suitable processors that may be employed to provide for parallel and/or sequential execution of one or more portions of the techniques described herein. FlowBOT 110 performs these operations as a result of central processing unit executing software instructions contained within a computer-readable medium, such as within memory. In one embodiment, the software instructions of the system are read into memory associated with the FlowBOT 110 from another memory location, such as from storage device, or from another computing device via communication interface. In this embodiment, the software instructions contained within memory instruct the processor to perform processes described below. Alternatively, hardwired circuitry may be used in place of or in combination with software instructions to implement the processes described herein. Thus, implementations described herein are not limited to any specific combinations of hardware circuitry and software.

In an embodiment, a FlowBOT server 110 is located in a central control room of the pipeline/LNG/Gas Plant/refinery/offshore oil and gas platform facility, and the FlowBOT server communicates with the facility's SCADA system 130 via the OPC DA protocol. The OPC DA protocol (OPC Data Access specification) or API communication connection specifies communication between data acquisition devices such as PLCs to display and interface devices such as SCADA systems. Alternatively, another protocol would specify communications between FlowBOT 110 and SCADA system 130. In another embodiment not shown, FlowBOT software 110 would reside in an off-site server (e.g., the Cloud), and would link to the plant SCADA system 130 via a suitable internet communication connection, assuming this arrangement is permitted by security protocols of the pipeline operating company. An additional embodiment not shown is utilizing the same configuration as an advisory service and not controlling the end equipment.

Data received by the FlowBOT 110 from the SCADA system 130 includes any information required to perform optimal control calculations to maintain the required flow rate and to meet additional economic objectives. In various embodiments, information received by FlowBOT 110 from SCADA 130 includes: (a) Required overall pipeline/LNG plant/Gas plant flow rate, as set by the control center operator; (b) Current measurements taken from transmitters located on the operating pipeline, including flow rate, pressures, and temperatures; (c) Signals that indicate the presence of common disturbances on the pipeline/LNG plant/Gas plant/refinery/offshore oil and gas platform including pump or pump station status, and flow path status, in the case of multiple delivery paths; and (d) Drag reducing agents (DRA) dosage rates and locations. Additionally, FlowBOT 110 may receive linefill information indicating the location of various products within the pipeline. In various embodiments, linefill information is received from SCADA 130, is received directly from a third-party leak detection software package 140 (e.g., running on a separate server), or is received from both of these sources.

In various embodiments, FlowBOT 110 includes various databases as organized collections of data, stored in non-transitory, machine-readable storage. In an embodiment, the databases may execute or may be managed by database management systems (DBMS), which may be computer software applications that interact with users, other applications, and the database itself, to capture (e.g., store data, update data) and analyze data (e.g., query data, execute data analysis algorithms). In some cases, the DBMS may execute or facilitate the definition, creation, querying, updating and/or administration of databases. The databases may conform to a well-known structural representational model, such as relational databases, object-oriented databases and network databases. Exemplary database management systems include MySQL, PostgreSQL, SQLite, Microsoft SQL Server, Microsoft Access, Oracle, SAP, dBASE, FoxPro, IBM DB2, LibreOffice Base, and FileMaker Pro. Exemplary database management systems also include NoSQL databases, i.e., non-relational or distributed databases that encompass various categories: key-value stores, document databases, wide-column databases, and graph databases.

Based upon information sent by FlowBOT 110 to SCADA 130, as product batches flow through the pipeline, the pump station pressure set-points are automatically adjusted to maintain the desired flow rate based on local feedback information of flow rate. Information sent by FlowBOT 110 to SCADA 130 includes pump station and delivery site pressure set-points. FlowBOT 110 also notifies operators of any need to turn on or off pumps at any location within the pipeline. Optionally, FlowBOT 110 can initiate pump start/stop sequences, if that function has been set up by the pipeline operator.

In an embodiment, FlowBOT software 110 incudes a function allowing the pipeline operator to switch instantaneously between automatic mode (FlowBOT-issued pressure set-points 160) and manual mode (operator-issued pressure set-points 150). The operator can revert to manual mode at any time through a single on/off button programmed into the existing screens. Likewise, the pipeline operator can actuate FlowBOT 110 to take pipeline/LNG plant/gas plant/refinery/offshore oil and gas platform control, once data quality and communications (watchdog) checks have been performed. In an embodiment, outputs from FlowBOT 110 are handled in the same manner as pipeline/LNG plant/gas plant/refinery/offshore oil and gas platform operator-entered outputs when in manual control, and undergo the same feasibility checks as built into the existing SCADA system 130 and provides the same level of safety. Process constraints are also programmed into the FlowBOT algorithm 110 so the calculated actions are within safe operating limits before entering SCADA.

In an example of use, the control center operator activates automatic operation of FlowBOT to take control actions on the operator's behalf. Once automatic mode of FlowBOT is activated, control actions are only performed after data quality and communications (watchdog) checks have been performed by the software. Information sent out of FlowBOT to SCADA in automatic mode includes key control point settings that the control center operator currently issues, such as valve and pump set-points. Many of the control operations controlled and managed by the FlowBOT system are implemented simultaneously through the pipeline/LNG plant/gas plant/refinery/offshore oil and gas platform system and at the various pump stations and control valves, including, without limitation, valve opening and closing, pump activation and deactivation, sensor analysis and communications, issuance of pressure, valve and pump set points, pump start/stop sequences, and many other activities. Subsequently, the control center operator activates a function that switches out of automatic mode to manual mode. The FlowBOT software switches instantaneously to manual control (operator issued pressure set-points), and the process is returned at its current operating conditions.

Figure 2:
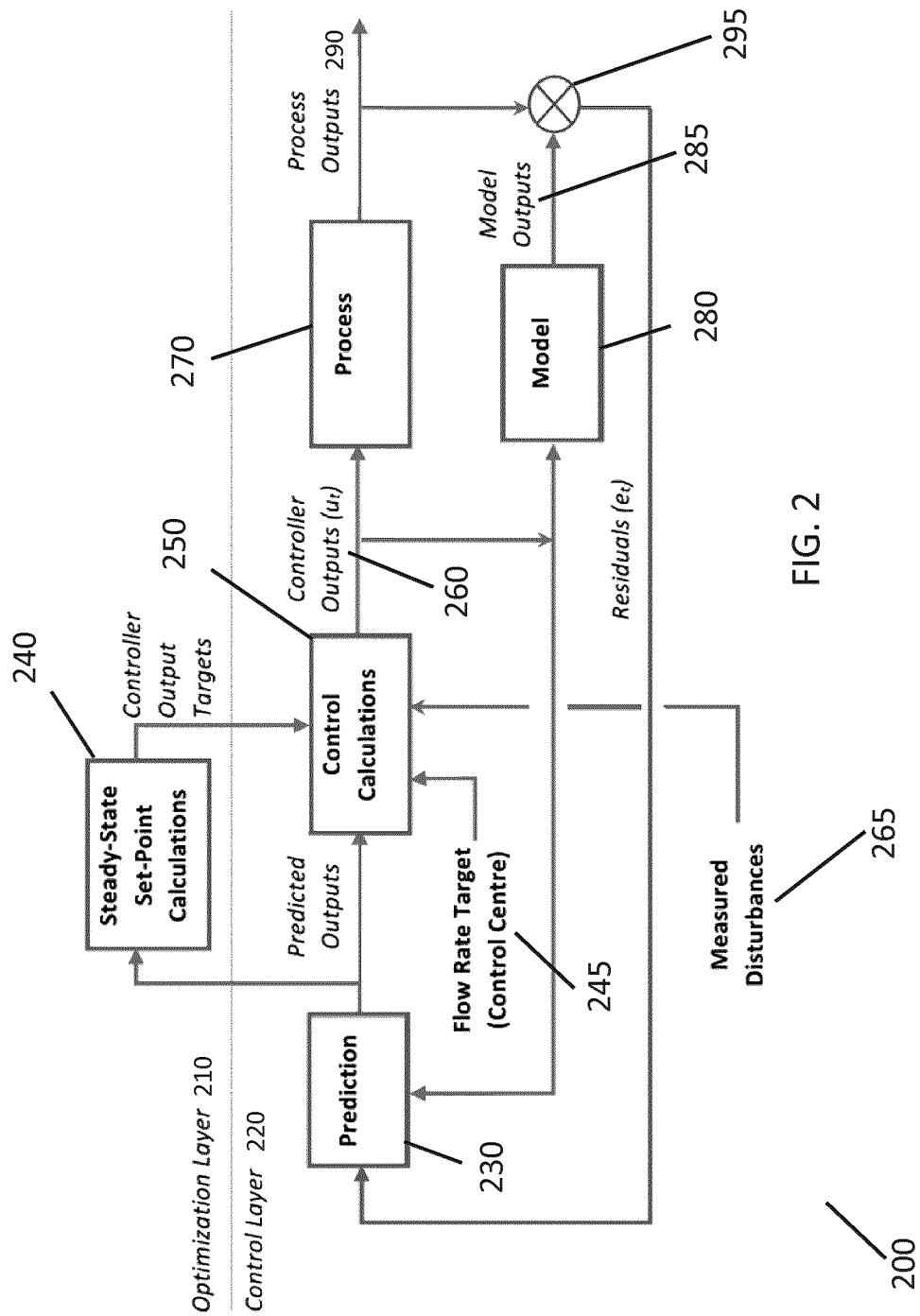
FIG. 2 shows a schematic diagram of functional blocks and signal flow in controller output calculations for the control system software, in accordance with an embodiment.

FIG. 2 shows functional blocks and signal flow in controller output calculations 200 for the FlowBOT software. This control scheme has been developed based on a control scheme known as Model Predictive Control (MPC). MPC is described in Dale E. Seborg, Edgar, Mellinchamp, Process Dynamics and Control, 2nd Ed, 2004, which is incorporated herein by reference for all purposes. A linear process model is most often used to both predict the effect of future control actions and to correct for model bias based on a comparison with current measurements. Models can be expressed in ARX (Auto-Regressive with Exogenous Input) form, and can be derived from bump testing along the pipeline or from dynamic first-principles hydraulic models and are enhanced with machine learning.

Controller output calculations are performed at each time step in the Control Calculations block 250 of FIG. 2 by minimizing a control cost function subject to constraints on station pressure set-points (u) and flow rate (y) variables. The form of the MPC quadratic cost function is:

$$J = \sum_{t=0}^{N} [\underbrace{e_{t+1} P e_{t+1}^T}_{1^{st}\ Term} + \underbrace{\Delta u_t Q \Delta u_t^T}_{2^{nd}\ Term} + \underbrace{f_t R f_t^T}_{3^{nd}\ Term}]$$

The first term of the above expression is a set-point error term. Set-point error drives the controller outputs towards the desired flow rate set-point based on the predicted errors/residuals (et) using a proportional control law. For pipeline flow rate control, maintaining balanced flow along the line is an important operating objective so the weightings in P are typically uniform. For LNG plant and Gas plant flow rate control, maintaining balanced flow through all equipment is an important operating objective so the weightings in P are typically uniform. The dimension of predicted errors/residuals vector et is typically >100 as it is a product of the number of controller outputs (e.g., pump stations under control) and the prediction horizon.

The prediction horizon is determined by the time (in sampling instants) that a change in pressure at the first pump station takes to affect flow at the last pump station.

The second term of this expression is an actuation move term, which limits the rate of change of the station pressure set-points (Δut). Set-point rate limits are commonly present in plant SCADA systems and the MPC control law implements this set-point ramp rate in order to prevent wind-up. Wind-up can occur in a control system that operates over a wide range of operating conditions when the manipulated variable reaches the actuator limits and the feedback loop is assumed to be broken. In this event, the system runs in open loop because the actuator will lock in saturation.

The third term of the expression allows inequality constraints to be imposed on the solution, driving signals (ft) towards target values. These are 'soft' constraints on the solution, in which the value may not be at target at all times. In contrast, the FlowBOT software imposes hard constraints on many variables such as high and low station pressure values. A common liquid pipeline operating objective is to maintain pump station suction pressures at low values along the pipeline ("lean operation"). This operating objective can be achieved by specifying current low suction pressure limits as targets, used in the third term of the MPC quadratic cost function J for the pump station set-points. This function tunes the speed at which the solution is driven to these targets while maintaining the overall solution of desired pipeline flow rate, via weights incorporated into the term R.

The steady-state optimization layer 210 of FIG. 2 is an integral part of the MPC scheme. For liquid pipeline operation, objectives of this component are to minimize power and drag reducing agent (DRA) usage, while still achieving the target set-point. Either linear or quadratic optimization objective functions are normally used. The Steady-State Set-Point Calculations block 240 in the Optimization Layer allows other pipeline/LNG plant/gas plant system operating objectives to be satisfied. One objective is to minimize power consumption while still achieving the target set-point. This is achieved through optimal selection of the mix of pressure/temperature/flow set-points and pumping/compressor units along that line for the desired flow rate. This information is used as an inequality constraint in the Control Calculations objective function J.

The control layer 220 of FIG. 2 includes Prediction block 230, which uses current and future Controller Outputs to predict future Process Outputs over a predetermined prediction horizon. The predictions are compensated for bias (inaccuracies) by adjusting for the difference between currently measured Process Outputs 290 from the Process block 270, and Model Outputs 285 from the Model block 280.

The Control Calculations block 250 determines the next control move (e.g., pump station pressure set-points) that minimizes the objective function J, as described in discussion of the MPC quadratic cost function above. The incoming Flow Rate Target 245 is set by the control center operator. Outputs 260 at time t(ut) are sent to the Prediction Block 230 and Model Block 280, as well as to the pipeline/LNG plant/gas plant control system (SCADA) affecting, ultimately, flow rates on the operating pipeline/LNG plant/Gas plant system.

The Process block 270 represents the actual physical operating pipeline system and associated substructure control systems 108. Process block 270 represents the actual physical operating LNG plant/Gas plant/refining/offshore oil and gas platform and associated substructure control system 808, 908, 1008, and 1108, respectively. Process Outputs 290 from the Process Block 270 of the operating pipeline system or LNG plant/gas plant/refinery/offshore platform system are measured. These variables include flow rates, pressures, temperatures and pump/compressor unit statuses. The Model block 280 calculates Model Outputs 285, i.e., expected values of Process outputs 290 using the same model as used in the Prediction block 230. The Model Output 285 is compared 295 to the actual Process Output values 290, and the difference of these values is used to correct bias in the Prediction block 230.

Measured Disturbances (MDs) 265 include effects that can be sensed but not directly controlled. If designed to accommodate these types of disturbances, the Control Calculations block 250 will take compensatory (feed-forward) actions to mitigate the effect of these disturbances. For example, if a pump shuts off unexpectedly in a liquids pipeline, and is detected via a run status or other signal, the Control Calculation block 250 can contain logic to adjust upstream and downstream pump station set-points. This adjustment can ensure that pressure constraints are not violated due to the disturbance created by the pump trip at the adjacent station.

In an embodiment, MDs 265 are grouped into two types:
 a. Disturbances that require constraints to be adjusted in the solution to counteract their effects. An example of this type is a pump or station trip where, upon detection via pump status or other indicative signals, FlowBOT would adjust the upstream and downstream pump station discharge and suction pressure constraints so that the predicted wave would not cause a high or low alarm, potentially bringing down the whole pipeline.
 b. Disturbances that require switching between models to accommodate different operating modes. An example is a flow path switch between different downstream legs of the pipeline, in which the hydraulics change sufficiently to warrant use of a different model. Different pipeline constraints may be required in this example. The pump station trip example for MDs type 'a' also would require that the dynamic model and MPC solution be adjusted, due to the facts that no control can be exercised at that pump station and pipeline segments lengths are increased because stations are bypassed.

Figure 3:
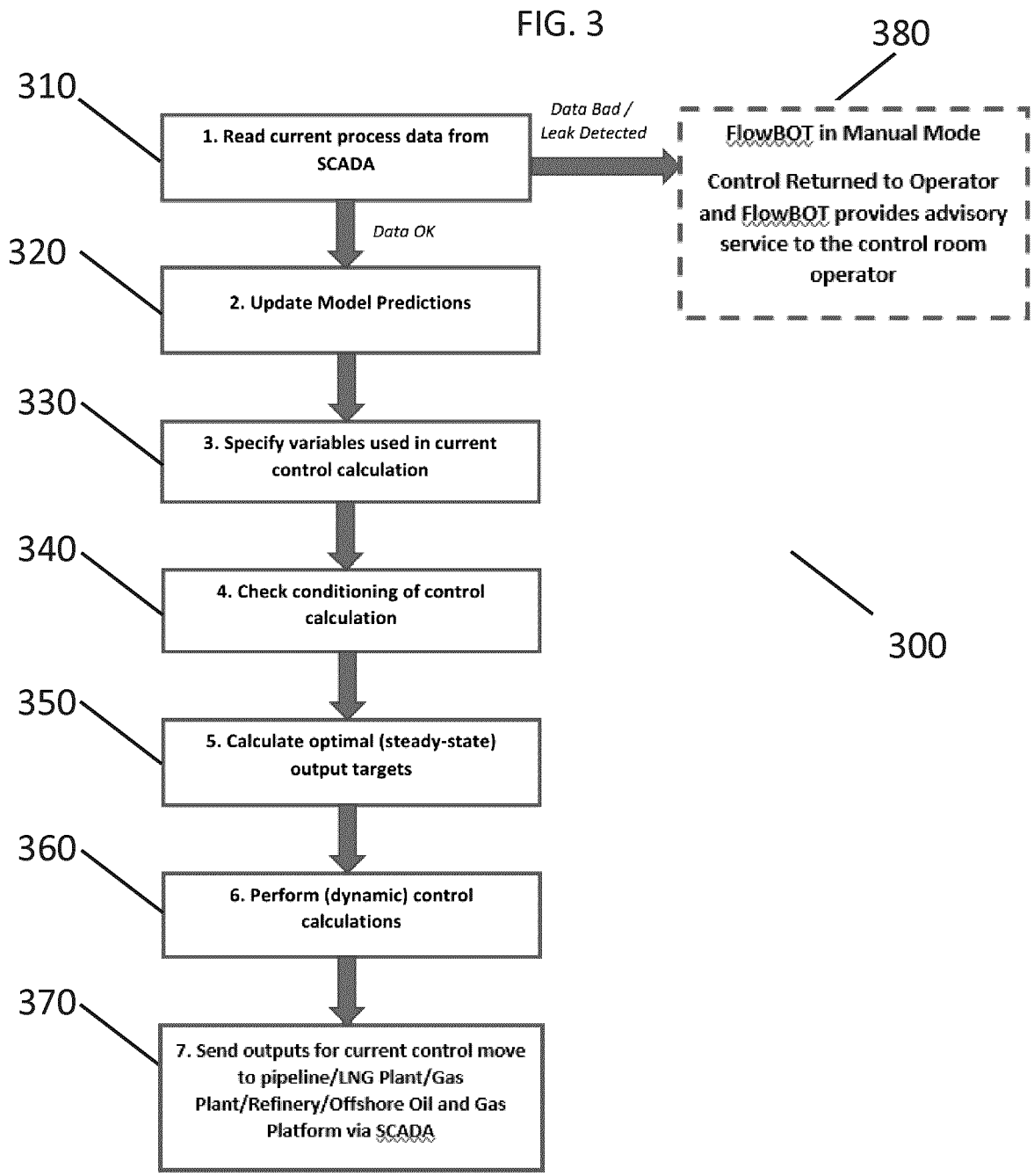
FIG. 3 shows a flow chart schematic of a method for calculating Model Predictive Control (MPC), in accordance with an embodiment.

FIG. 3 a flow chart schematic of a method 300 used by the FlowBOT software for calculating Model Predictive Control (MPC). At step 310, FlowBOT acquires new data from the SCADA system for control calculations. In an embodiment the OPC software that facilitates communication of FlowBOT with the SCADA system, and the FlowBOT software itself, performs data quality algorithms. If bad data cannot be reconciled, the control is returned 380 to the pipeline/LNG plant/gas plant/refinery/offshore oil and gas platform operator after a sufficient waiting period during which FlowBOT maintains its last output value. In an embodiment, if third-party leak detection software 140 (FIG. 3) identifies a potential leak, control returns 380 to the operator, unless an alternative protocol for handling potential leaks has been established by the pipeline operating company. The FlowBOT provides advisory services to the control room operator.

If any bad data detected can be reconciled at 310, then control proceeds to step 320. At step 320, the process updates model predictions with the updated information received from SCADA.

At step 330, the method determines which points are available for the calculations, taking into account pump stations or sensors that are not available, and flow paths in the pipeline. In an embodiment, the MPC calculations include checks 340 for ill-conditioning of the control calculations, as the structure of these calculations can change from one time step to the next. If FlowBOT is configured for steady-state optimization of pipeline/LNG plant/gas plant/refinery/offshore oil and gas platform energy and/or DRA usage, the method performs set-point calculations at step 350. At step 360, the method performs dynamic control calculations to minimize the quadratic cost function, as described above for FIG. 2. The results of this calculation are the optimized control moves (pump station set-points) for the next M time steps based on the current information available. At step 370, the method sends only the first of these M control moves via SCADA to the pump stations. The method 300 uses a receding horizon control sequence, in which it repeats steps 310 through 370 at each time step.

The Model Predictive Control (MPC) control scheme 200, 300 combines multivariable model-based predictive control with algorithms based on operating domain experience and machine learning. These characteristics enable the control scheme to coordinate and execute pipeline start-ups and large rate changes involving numerous control nodes, and to provide stable control at optimized steady-state set-points.

Planned or unplanned flow rate changes occur continually in pipeline/LNG plant/gas plant/refinery/offshore oil and gas platform systems. Therefore, control room operators are required continually to adjust these systems to maintain target flow rate values. In comparisons of manual mode operation and the automatic mode operation of the present disclosure, the Applicant has observed that for any system with two or more measurement and control points, a human operator would not be able to perform optimized control calculations equivalent or similar to the methods described above. There are various reasons for this observation:

a. For pipeline systems with multiple control points, there are large volumes of information to read and interpret, from which subsequent determination of the required control actions are made. An automatic control system can continuously perform these monitoring and calculation tasks without negative human factors such as inattention, calculation errors or fatigue related mistakes.

b. The dimensions of the matrix calculations in the control scheme illustrated in FIGS. 2, 3 are large. For the simplest systems with two or more control points, repetitive matrix calculations with dimensions typically much greater than two are required, at frequencies of as little as five seconds.

c. At every sampling interval, the control system calculates and enacts optimal control actions in SCADA simultaneously for all control points. In contrast, human operators determine required control actions based on written and/or experience based procedures, and enter these updated station set-points into SCADA via mouse clicks on a one-at-at-time basis. These manual operator actions are performed at a frequency much slower than the sampling interval used for the above described control scheme. It is not possible for the operator to perform the calculations or to enact them in the SCADA system at comparable speeds.

d. Experienced control room operators can anticipate the effect of control actions or disturbances at one point in the pipeline/LNG plant/gas plant/refinery/offshore oil and gas platform system on other points. These judgments become more accurate as the experience of the control room operator increases. Models used in the control algorithm described above provide quantitative predictions that are independent of human experience levels.

Figure 4:
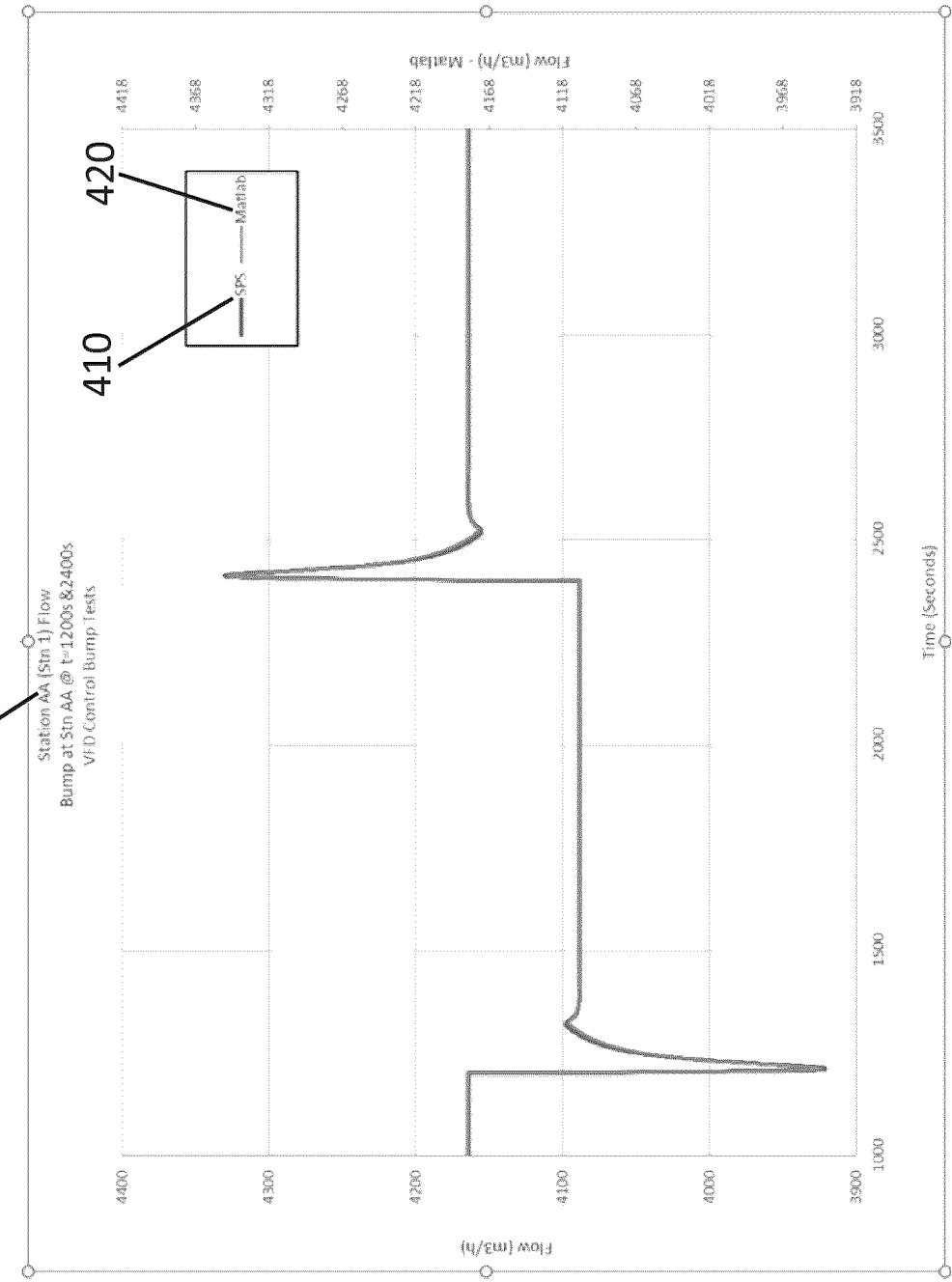
FIG. 4 shows a graph of a comparison of bump test response of a transient simulation model of a crude oil pipeline controlled using the FlowBOT control system, in comparison to a Synergi™ SPS simulator, in accordance with an embodiment.

In an exemplary embodiment of system verification, the FlowBOT system was tested on a first-principles hydraulic transient simulation model of a crude oil pipeline including five pump stations in a 300 km, 30" diameter line. The model was verified against the industry standard DNV GL SPS Synergi™ Transient Simulator. Synergi™ Pipeline Simulator software (supplied by DNV GL, Høvik, Norway) is used for defining safe pipeline operating limits and operator qualification for liquid or gas pipelines or networks. The graph 400 of FIG. 4 shows the accuracy of a Matlab 420 simulation model based on the FlowBOT method of the present disclosure, in comparison to a Synergi™ SPS simulator 410, for a bump test response.

Figure 5:
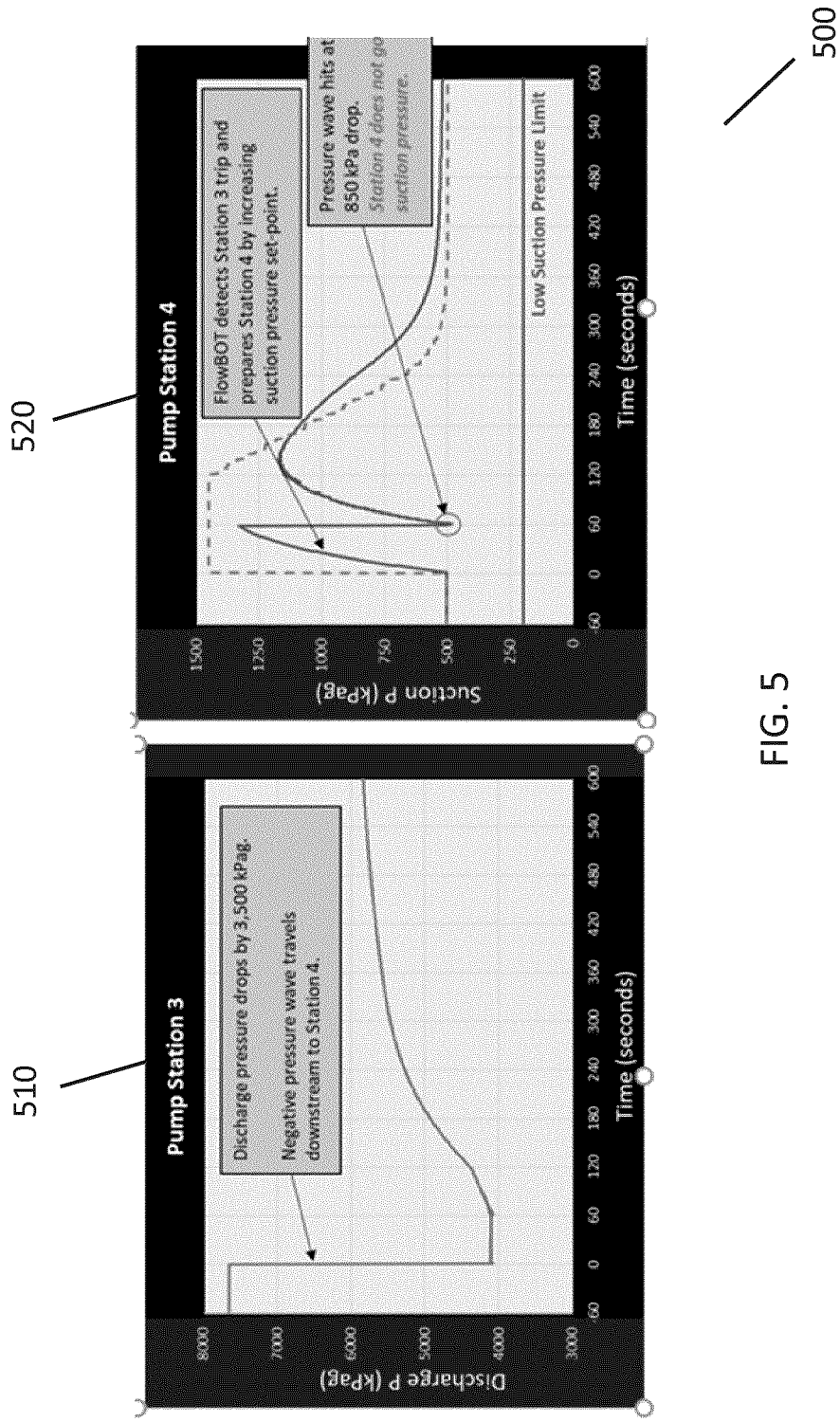
FIG. 5 shows graphs of an automatic shut-down scenario (pump station trip), in accordance with an embodiment.

The graphs 500 of FIG. 5 show a test of a pump station trip scenario, i.e., an unexpected shut-down. A pressure wave approximately 3,500 kPa in magnitude was created by the trip at Pump Station 3 (graph 510), and traveled downstream to Pump Station 4 in approximately 60 seconds (graph 520). If unattenuated, this wave would cause Station 4 to shut down due to a low suction pressure alarm, and would shut down the entire pipeline. The FlowBOT software anticipated this scenario and took preventative actions at Pump Station 4 to prevent a station shut-down and to allow the pipeline to remain operational. In contrast, control center operators using conventional control systems often do not detect a pump station trip in sufficient time, nor can they calculate an appropriate, timely response at the adjacent pump stations based on current hydraulic conditions. As a result, control center operators using conventional control systems may not be able to implement a response that would prevent a full pipeline shut-down in comparable circumstances.

Figure 6:
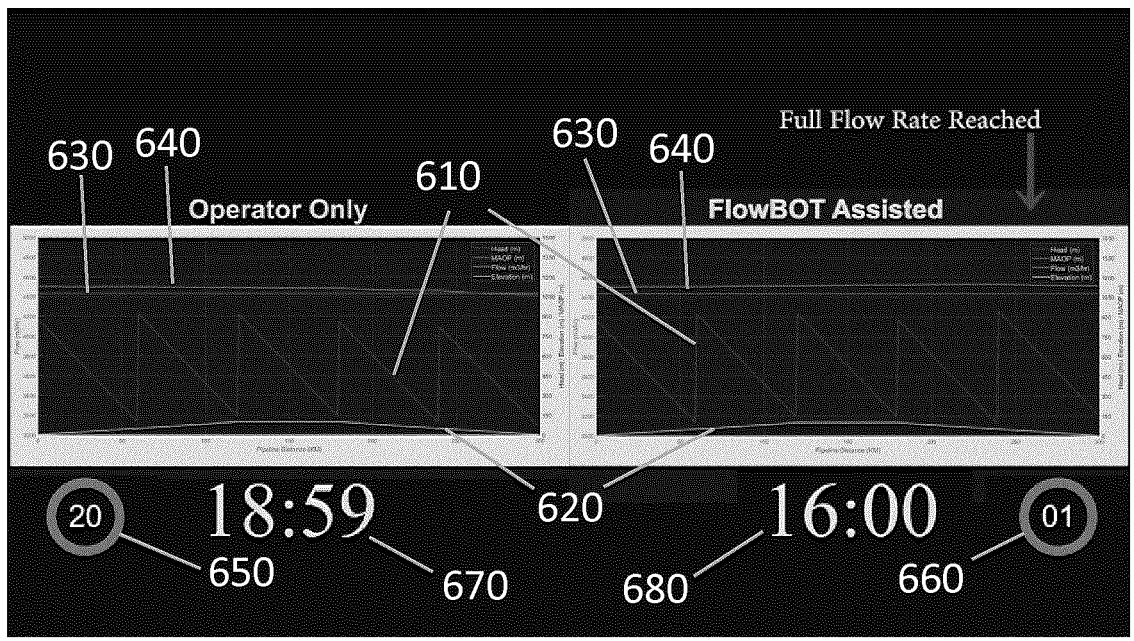
FIG. 6 shows a video still from a line presentation video displaying flow rate change from 4,000-5,000 $m^3/h$, in accordance with an embodiment.
Figure 7:
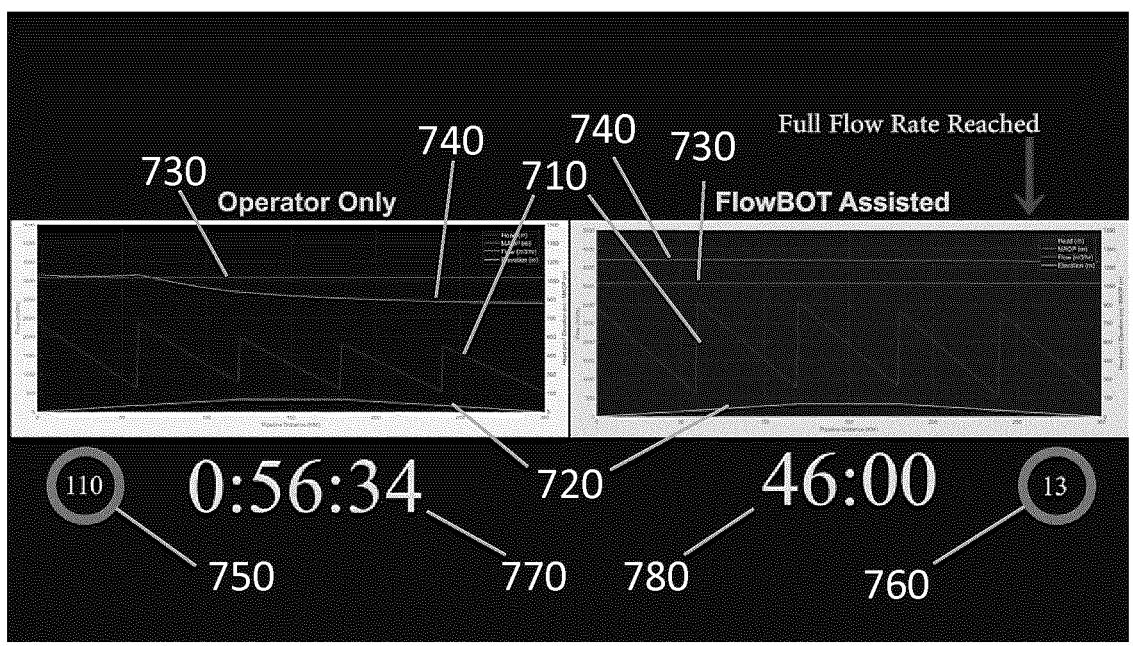
FIG. 7 shows a video still from a line presentation video displaying line start-up from 0-4,200 $m^3/h$, in accordance h an embodiment.

In an exemplary embodiment, a simulation generated line presentation video displays of two pipeline operating scenarios. The line presentation displays simulated two operating scenarios: (a) flow rate change from 4,000-5,000 m3/h; and (b) line start-up from 0-4,200 m3/h. Side-by-side simulation displays included a left side display showing pipeline operator manual control and a right side display showing FlowBOT automatic operation, including time indicators showing elapsed time for each of the left side and right side displays. FIG. 6 is a video still 600 from the line presentation video displaying flow rate change from 4,000-5,000 m3/h, taken at a time at which FlowBOT automatic operation first reached full flow rate as seen at elapsed time indicators 650, 660. FIG. 7 is a video still 700 from the line presentation video displaying line start-up from 0-4,200 m3/h, taken at a time of completion of pipeline operator manual control as seen at elapsed time indicators 750, 760.

Graphical elements of the line presentation video displays include a blue line (610, 710) depicting pipeline pressure head; a green line (620, 720) indicating minimum line pressure constraint; a red line (630, 730) indicating maximum line pressure constraint; and a pink line (640, 740) indicating flow rate. A green circle at the left side (650, 750) contains a count of the number of commands issued by the operator, while a green circle on the right side (660, 760) contains a count of the number of commands issued by FlowBOT automatic operation.

The simulation displays showed various notable comparisons of manual operation versus automatic operation. During automatic operation, pipeline (pressure) head (610, 710) did not exceed the minimum (620, 720) or maximum (630, 730) pressure constraints. Flow rate (640, 740) was brought up to and stabilized at the desired level at least 40% faster with FlowBOT compared to the manual pipeline operating procedures. In comparison to the number of commands issued by the operator (650, 750), the number of commands issued by FlowBOT automatic operation (660, 760) was reduced by about a factor of 10 or greater.

Further details regarding methods, modules, components, steps, embodiments, applications, features, platforms, and advantages are set forth in the attached Exhibit 1 containing video stills from the line presentation video displaying flow rate change from 4,000-5,000 m3/h, and video stills from the line presentation video displaying line start-up from 0-4,200 m3/h, the content of which is incorporated herein in its entirety.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product

The invention claimed is:

1. A method, comprising:
receiving at a processor a first current data and at least one first past data relating to a first detected pressure at a first portion of a pipeline, wherein a first valve is coupled to the first portion;
receiving at the processor a second current data and at least one second past data relating to a second detected pressure at a second portion of the pipeline, wherein a second valve is coupled to the second portion;
receiving at the processor a third current data and at least one third past data relating to a first detected status of a first pump coupled to the pipeline;
receiving at the processor a fourth current data and at least one fourth past data relating to a second detected status of a second pump coupled to the pipeline; and
automatically adjusting, via the processor, at least two of the first pump, the second pump, the first valve or the second valve, simultaneously, based on a real-time analysis and multivariable dynamic models, using the first current data, the at least one first past data, the second current data, the at least one second past data, the third current data, the at least one third past data, the fourth current data, and the at least one fourth past data, to at least one of maintain or stabilize a flow rate of the pipeline in real time and at a future point in time.

2. The method of claim 1, wherein the pressure of the pipeline is maintained in real time and at a future point in time within a pressure range below a maximum allowable operating pressure and above a minimum allowable operating pressure.

3. The method of claim 1, further comprising monitoring a first current value and at least one first past value from a first sensor coupled to the first portion and a second current value and at least one second past value from a second sensor coupled to the second portion.

4. The method of claim 3, wherein the adjusting is controlled based on at least one trajectory determined from at least one of the first current value and the at least one first past value from the first sensor or the second current value and the at least one second past value from the second sensor.

5. The method of claim 1, further comprising receiving at the processor a fifth current data and at least one fifth past data relating to a first temperature at a fifth portion of the pipeline.

6. The method of claim 5, further comprising receiving at the processor a sixth current data and at least one sixth past data relating to a second temperature at a sixth portion of the pipeline.

7. The method of claim 1, further comprising receiving at the processor a seventh current data and at least one seventh past data relating to a first flow rate at a seventh portion of the pipeline.

8. The method of claim 7, further comprising receiving at the processor an eighth current data and at least one eighth past data relating to a second flow rate at an eighth portion of the pipeline.

9. The method of claim 1, further comprising receiving at the processor a ninth current data relating to a leak in the pipeline, wherein the ninth current data is a first linefill data, wherein the first linefill data is received from a third-party application.

10. The method of claim 1, wherein the automatically adjusting, via the processor, at least two of the first pump, the second pump, the first valve or the second valve is accomplished via a predetermined sequence.

11. The method of claim 1, wherein the automatically adjusting, via the processor, at least two of the first pump, the second pump, the first valve or the second valve is accomplished simultaneously.

12. The method of claim 1, wherein the automatically adjusting is accomplished based on an advanced calculation of equipment set points.

13. The method of claim 1, wherein the automatically adjusting, via the processor, at least two of the first pump, the second pump, the first valve or the second valve is accomplished by automatically calculating a plurality of optimal control actions to achieve a desired flow rate target, and automatically implementing commands to implement the control actions.

14. The method of claim 1, wherein the execution of commands is accomplished simultaneously at all control points.

15. The method of claim 1, wherein the automatically adjusting is via a multivariable dynamic model based on a dynamic state of the pipeline.

16. The method of claim 15, wherein the multivariable dynamic model predicts operating conditions of the pipeline based on past and future trajectories of pipeline processes that include pressure and pipeline operating constraints.

17. The method of claim 1, wherein the automatically adjusting is based on implementation of pre-emptive actions.

18. The method of claim 17, wherein the pre-emptive actions remediate frequent fault scenarios faster than a human operator can respond.

19. The method of claim 1, wherein the automatically adjusting is via a physical hydraulic transient model that provide control calculations based upon changing hydraulic environments.

20. The method of claim 1, wherein the automatically adjusting is accomplished via a steady-state optimization layer in conjunction with real-time control.

21. The method of claim 20, wherein the steady-state optimization layer determines optimized states without operator intervention and provides the optimized states as part of the calculation of automatic adjustments to equipment settings.

22. A method, comprising:
receiving at a processor a first current data and at least one first past data relating to a first detected pressure at a first portion of an offshore platform, wherein a pump is coupled to the first portion;
receiving at the processor a second current data and at least one second past data relating to a second detected pressure at a second portion of the offshore platform, wherein a subsea tie-back system is coupled to the second portion;
receiving at the processor a third current data and at least one third past data relating to a first detected status of a top side separation equipment coupled to the offshore platform;
receiving at the processor a fourth current data and at least one fourth past data relating to a second detected status of a valve coupled to the offshore platform; and
automatically adjusting, via the processor, at least two of the pump, the subsea tie-back system, the top side separation equipment, or the valve, simultaneously, via a calculated sequence based on a real-time analysis and multivariable dynamic models, using the first current data, the at least one first past data, the second current data, the at least one second past data, the third current data, the at least one third past data, the fourth current data, and the at least one fourth past data, to at least one of maintain or stabilize a flow rate of the offshore platform in real time and at a future point in time.

\* \* \* \* \*